United States Patent
Drolet et al.

(10) Patent No.: US 11,396,823 B2
(45) Date of Patent: Jul. 26, 2022

(54) SYSTEM AND METHOD FOR MONITORING TEMPERATURE OF A GAS TURBINE ENGINE

(71) Applicant: PRATT & WHITNEY CANADA CORP., Longueuil (CA)

(72) Inventors: Martin Drolet, Saint-Amable (CA); Melanie Brillant, Saint-Amable (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 417 days.

(21) Appl. No.: 16/551,161

(22) Filed: Aug. 26, 2019

(65) Prior Publication Data

US 2021/0062673 A1    Mar. 4, 2021

(51) Int. Cl.

| G01K 1/00 | (2006.01) |
| G01K 13/00 | (2021.01) |
| G01K 15/00 | (2006.01) |
| G01K 3/00 | (2006.01) |
| G01K 7/00 | (2006.01) |
| F01D 17/08 | (2006.01) |
| G01K 13/02 | (2021.01) |

(52) U.S. Cl.
CPC .......... *F01D 17/085* (2013.01); *G01K 13/02* (2013.01); *F05D 2270/303* (2013.01); *G01K 2205/02* (2013.01)

(58) Field of Classification Search
USPC .............. 374/1, 144, 115, 166, 208, 148
See application file for complete search history.

(56) References Cited

U.S. PATENT DOCUMENTS

| 3,618,386 | A | 11/1971 | Black |
| 4,161,101 | A | 7/1979 | Drummond |
| 6,708,676 | B2 | 3/2004 | Akao et al. |
| 2002/0150142 | A1* | 10/2002 | Sanderson ............... G01K 3/06 374/144 |
| 2012/0044969 | A1* | 2/2012 | Zebrowski ............... G01K 3/06 374/144 |
| 2013/0259088 | A1* | 10/2013 | Bellis .................... F01D 17/085 374/138 |
| 2015/0068209 | A1* | 3/2015 | Agrawal .................. F02C 7/32 60/726 |

(Continued)

FOREIGN PATENT DOCUMENTS

| CN | 106068366 A | * | 11/2016 | ............. F01D 21/00 |
| EP | 3608516 A1 | * | 2/2020 | ............. F01D 17/08 |

*Primary Examiner* — Mirellys Jagan
(74) *Attorney, Agent, or Firm* — Norton Rose Fulbright Canada LLP

(57) ABSTRACT

A method and system for monitoring a temperature of a gas turbine engine are described. The method comprises obtaining individual sensor readings from functioning temperature sensors of a sensor array, where a number of the functioning temperature sensors is less than a total number of temperature sensors in the sensor array; applying correction factors to the individual sensor readings of the functioning temperature sensors based on deviations of the individual sensor readings from a total average temperature of all the temperature sensors in the array, to obtain corrected individual sensor readings; and determining a corrected total average temperature as a sum of the corrected individual sensor readings divided by the number of functioning temperature sensors.

20 Claims, 7 Drawing Sheets

(56) References Cited

U.S. PATENT DOCUMENTS

2015/0267591 A1\* 9/2015 Miller ................. F02C 9/28
                                                     60/273
2017/0211487 A1\* 7/2017 Zhang ................. F02C 9/28

\* cited by examiner

SYSTEM AND METHOD FOR MONITORING TEMPERATURE OF A GAS TURBINE ENGINE

TECHNICAL FIELD

The present disclosure relates generally to gas turbine engines, and more particularly to temperature monitoring of gas turbine engines.

BACKGROUND OF THE ART

In order to protect a gas turbine engine from exceeding operating temperature limits, the maximum temperature in the thermodynamic cycle is quantified and monitored during operation. However, the temperature of certain locations of the gas turbine engine are difficult to measure due to instrumentation and material temperature limitations. Consequently, temperature instrumentation at these locations have a tendency to fail in service due to their harsh operating environment.

Therefore, improvements are needed.

SUMMARY

In accordance with a broad aspect, there is provided a method for monitoring a temperature of a gas turbine engine. The method comprises obtaining individual sensor readings from functioning temperature sensors of a sensor array, where a number of the functioning temperature sensors is less than a total number of temperature sensors in the sensor array; applying correction factors to the individual sensor readings of the functioning temperature sensors based on deviations of the individual sensor readings from a total average temperature of all the temperature sensors in the array, to obtain corrected individual sensor readings; and determining a corrected total average temperature as a sum of the corrected individual sensor readings divided by the number of functioning temperature sensors.

In accordance with another broad aspect, there is provided a system for monitoring a temperature of a gas turbine engine. The system comprises a processing unit and a non-transitory computer-readable medium having stored thereon program instructions. The program instructions are executable by the processing unit for obtaining individual sensor readings from functioning temperature sensors of a sensor array, where a number of the functioning temperature sensors is less than a total number of temperature sensors in the sensor array; applying correction factors to the individual sensor readings of the functioning temperature sensors based on deviations of the individual sensor readings from a total average temperature of all the temperature sensors in the array, to obtain corrected individual sensor readings; and determining a corrected total average temperature as a sum of the corrected individual sensor readings divided by the number of functioning temperature sensors.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
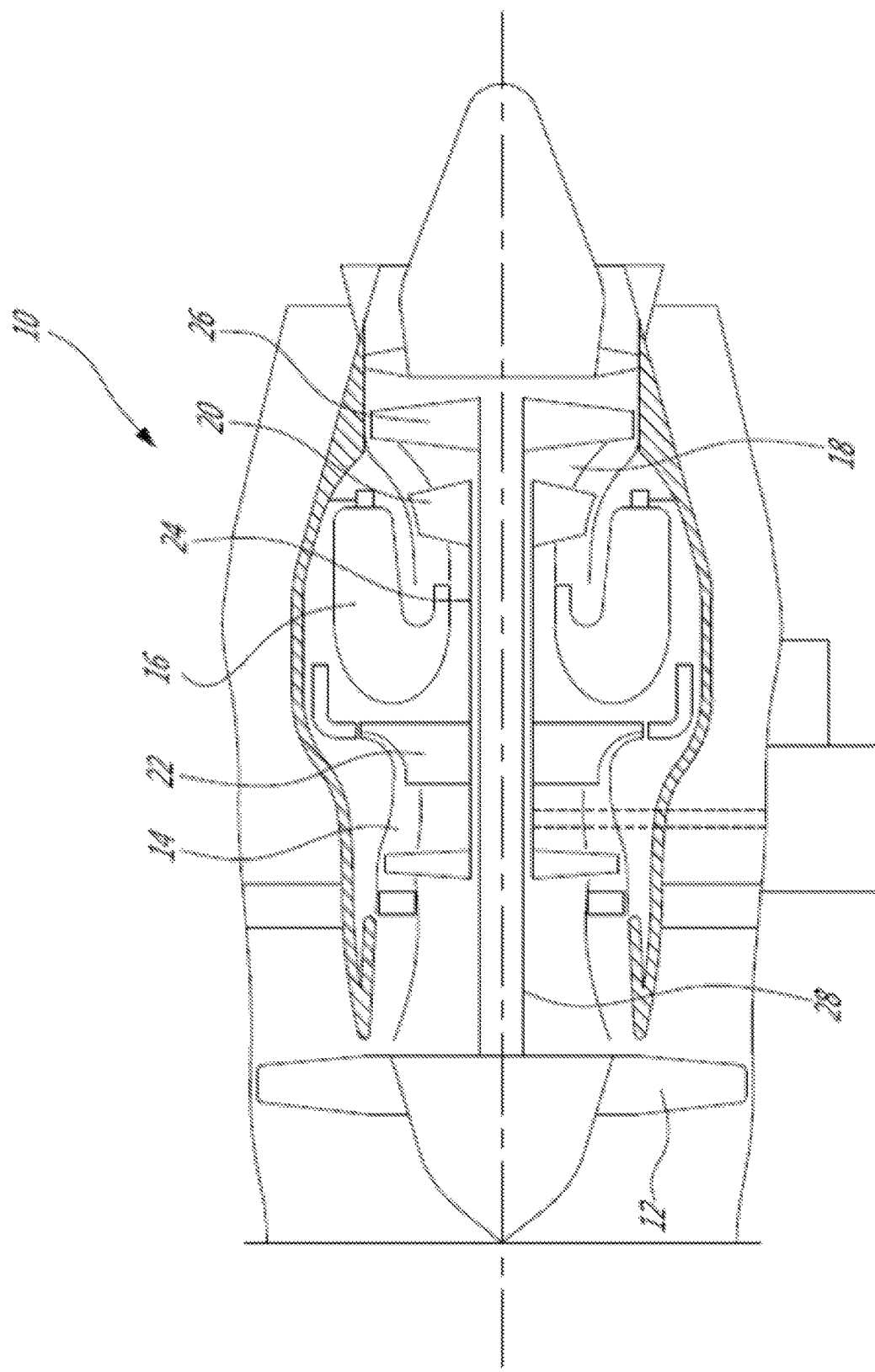
FIG. 1 is a schematic cross-sectional view of an example gas turbine engine.

FIG. 1 illustrates a gas turbine engine 10 of a type provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to low pressure rotor(s) 30 of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and an output shaft through which power is transferred. A turboprop engine may also apply. In addition, although the engine 10 is described herein for flight applications, it should be understood that other uses, such as industrial or the like, may apply.

Figure 2:
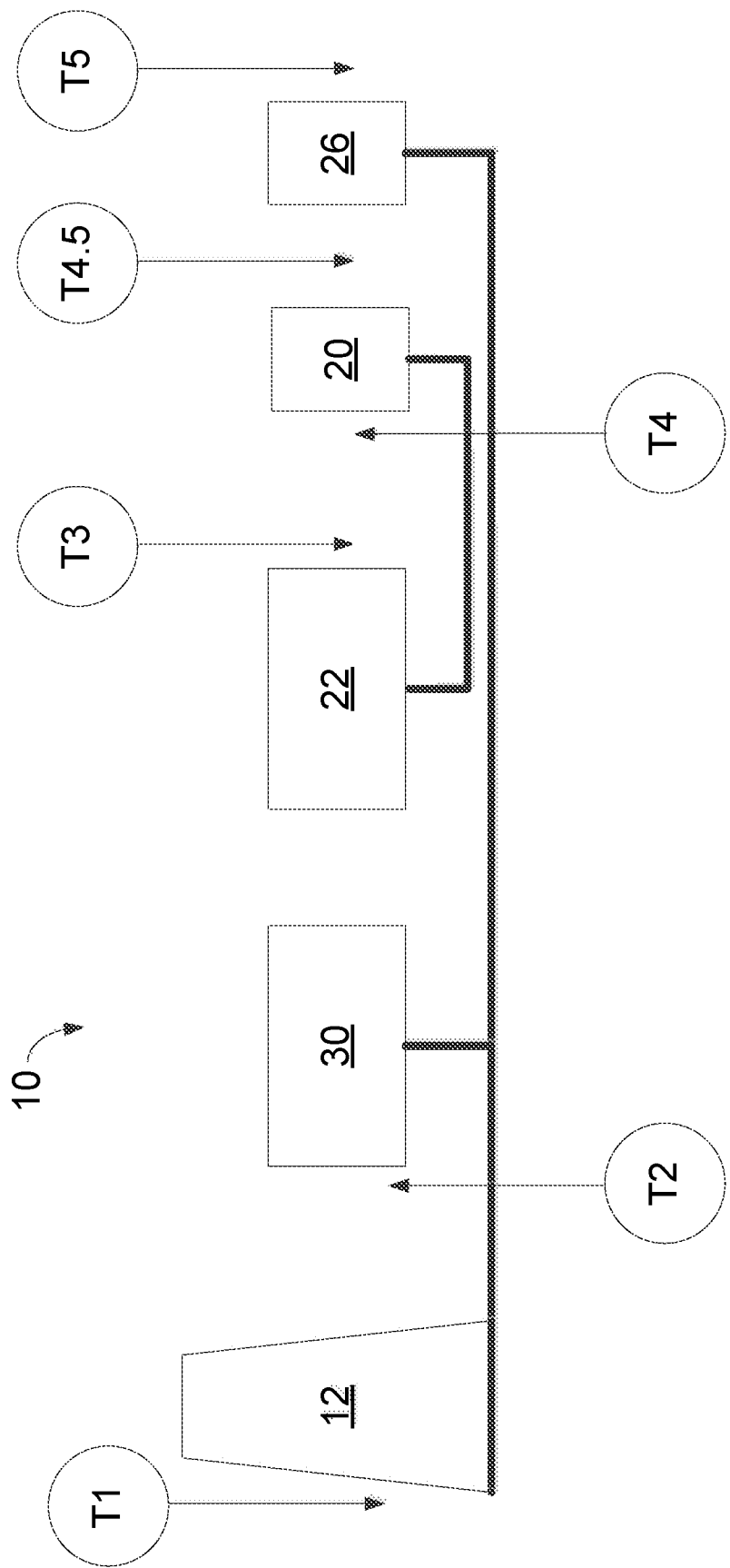
FIG. 2 is a schematic side view of a gas turbine engine showing example temperature measurement locations.

As air passes through the engine 10, it undergoes numerous pressure and temperature changes along the way. The path along which air flows is referred to as the "gas path". Example temperature measurement points for the airflow along the gas path are illustrated in FIG. 2. T1 refers to an inlet temperature, taken just as the air enters through the fan rotor 12. T2 refers to a low pressure compressor inlet temperature, taken before the low pressure rotors 30 of the compressor section 14. T3 refers to a high pressure compressor delivery temperature, taken after the high pressure rotors 22 of the compressor section 14. T4 refers to a combustor outlet temperature, taken before the high pressure rotors 20 of the turbine section. T5 refers to the turbine outlet temperature, taken after the low pressure rotors 26 of the turbine section 18.

In order to protect a gas turbine engine from exceeding operating temperature limits, the maximum temperature in the thermodynamic cycle of the engine is quantified and monitored during operation. The maximum temperature usually occurs at location T4, which can be very difficult to measure due to instrumentation and material temperature limitations. Instead, the temperature at location T4 may be correlated with a temperature measured downstream from location T4, where the temperature is cooler, such as location T4.5, which is sometimes referred to as an inter-turbine or indicated turbine temperature (ITT) and is taken between the high pressure rotors 20 and low pressure rotors 26 of the turbine section 18. T4 to T4.5 correlations can be determined during the development phase of the gas turbine engine 10, and can be implemented in the engine control system.

Figure 3:
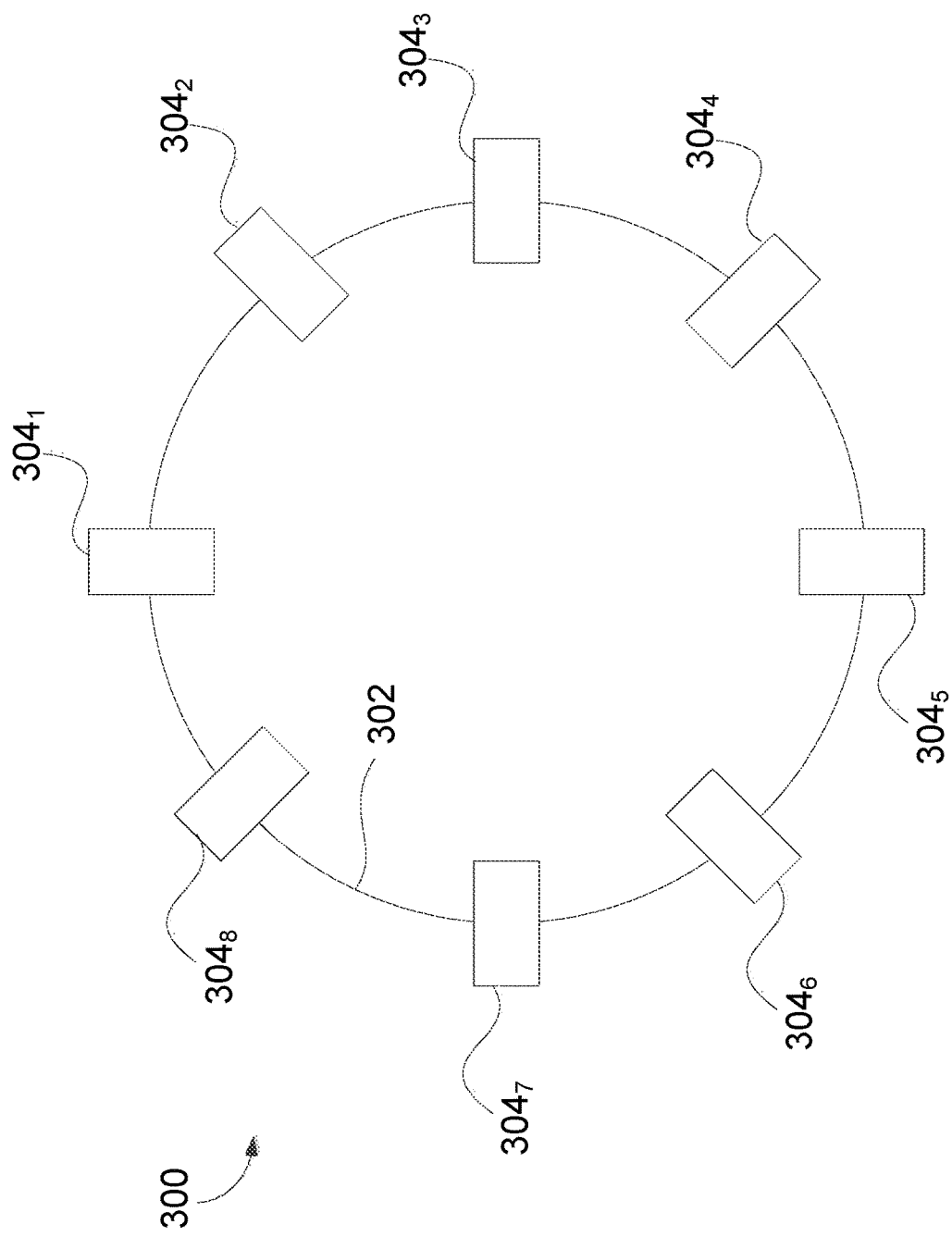
FIG. 3 is a schematic diagram of an example array of temperature sensors.

In some embodiments, the temperature at any location of engine 10, for example at location T4.5, is measured using an array of N temperature sensors. N Individual sensor readings are arithmetically averaged to calculate an average temperature for the given temperature location. The array of N temperature sensors may be disposed independently or may be supported by a harness having a given geometry. An example temperature sensor array on a harness is illustrated in FIG. 3. In this example, a harness 302 has a circular geometry and holds N=8 temperature sensors $304_1$-$304_8$ to form the sensor array 300. Other geometries for the harness 302 may also be used, such as ellipsoid, oval, rectangular, square, and the like, such that a circumference of the engine 10 is surrounded by the harness 302. Although shown as closed, the harness 302 may also be open, for example in a U-shape or a V-shape. Other harness geometries may also apply, depending on practical implementation.

The N temperature sensors may each be implemented as a thermocouple probe, whereby individual temperature-dependent voltages are measured from each sensor and interpreted to measure temperature. Each temperature sensor has its own wiring cables and leads to provide individual sensor readings. Other types of temperature sensors capable of recording individual temperature measurements may also be used, such as integrated circuit sensors, resistance temperature detectors, silicon bandgap temperature sensors, and the like. The number of temperature sensors and their location on the harness 302 may vary, depending on practical implementation.

Figure 4A:
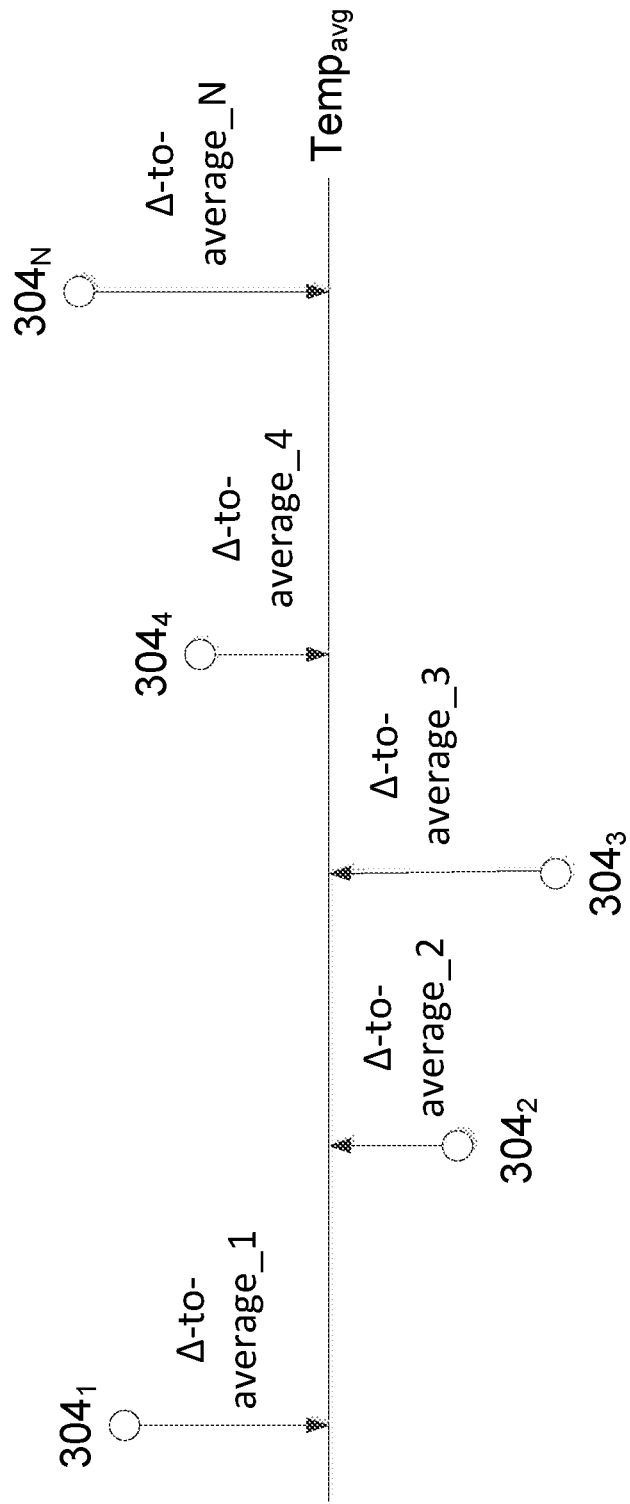
FIG. 4A is an example illustration showing the "delta-to-average" for a plurality of temperature sensors.

When one or more of the N temperature sensors fail, the temperature at the given temperature location may still be obtained. The effect of a non-functioning temperature sensor is cancelled out by applying a correction factor to each functioning temperature sensor of the array 300. The correction factor is sensor-dependent and is based on a deviation of the temperature sensor reading from an average, referred to herein as a "delta-to-average". An example is schematically illustrated in FIG. 4A, where temperature sensors $304_1$-$304_N$ are shown to deviate from an average temperature by a Δ-to-average_n, where n=1 to N.

When all N temperature sensors are functional, the average temperature is the sum of each sensor reading divided by the number of sensors (N):

$$Temp_{AVG} = \sum_{n=1}^{N} \frac{Temp_n}{N} \tag{1}$$

The correction factor may be expressed as a deviation of a given sensor reading ($Temp_n$) from the average temperature ($Temp_{avg}$):

$$CF_n = \frac{Temp_{AVG} - Temp_n}{Temp_n} = \Delta - to - average\_n \tag{2}$$

When a sensor fails, the readings from the K functional sensors (where K<N) are corrected by adding the correction factor ($CF_n$):

$$Temp_{n\_corrected} = Temp_n*(1+CF_n) \tag{3}$$

The corrected average temperature is the sum of the K corrected sensor readings divided by the number of functioning sensors:

$$Temp_{AVG\_corrected} = \sum_{n=1}^{N} \frac{Temp_{n\_corrected}}{K} \tag{4}$$

In some embodiments, the correction factors $CF_n$ are determined in real-time and stored when all N temperature sensors are functional. The correction factors $CF_n$ may then be used when K<N temperature sensors are functional.

Figure 4B:
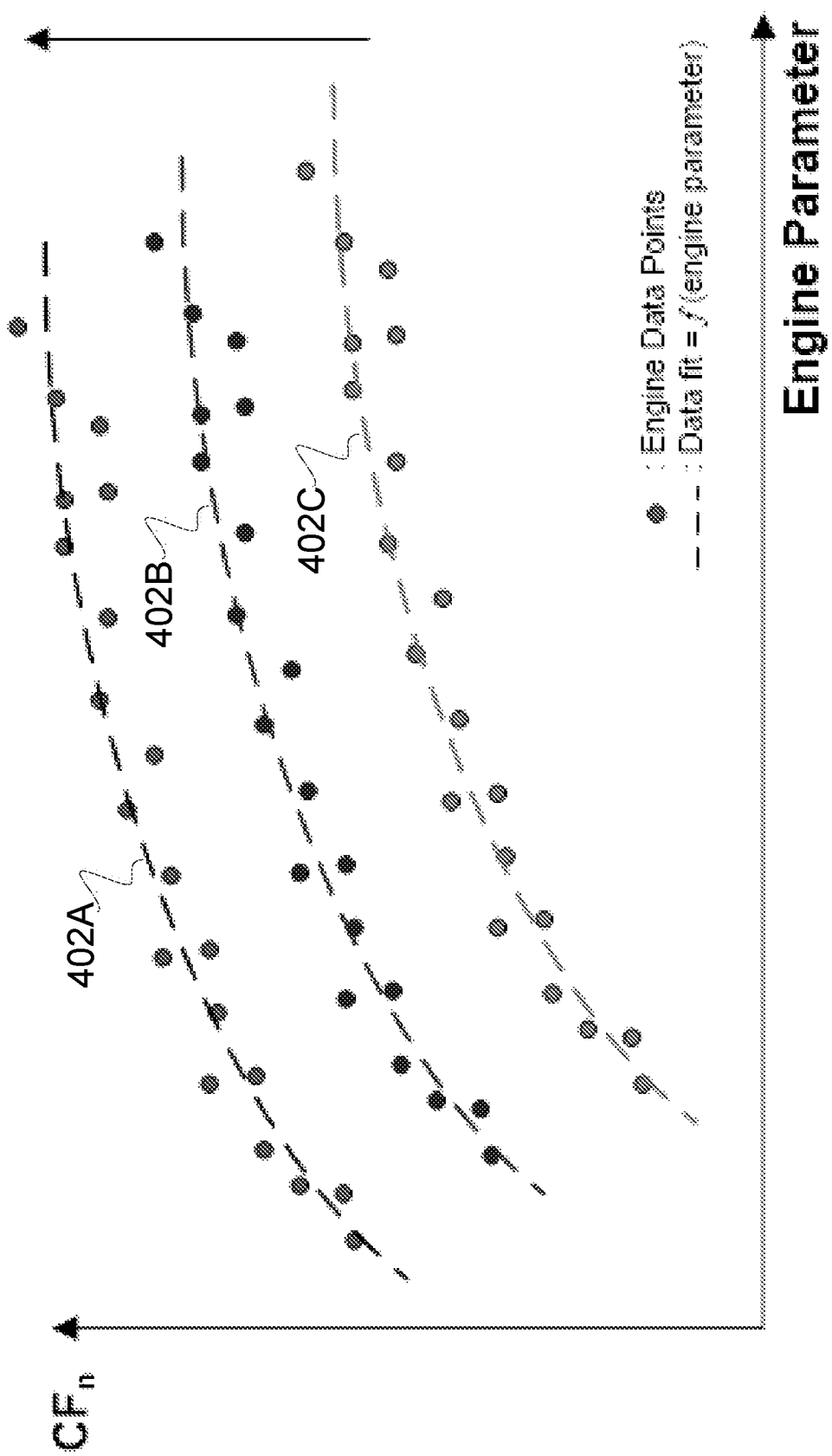
FIG. 4B is a graph showing multiple examples of f (Engine Parameter)

In some embodiments, the relationship between the average temperature ($Temp_{avg}$) as measured vs each individual sensor reading ($Temp_n$) can be characterized as a function of any relevant engine parameter, such as but not limited to engine power, compressor discharge pressure or temperature, speed, fuel flow, and the like. An example is illustrated in FIG. 4B, where multiple curves 402A, 402B, 402C are shown as example correlations or functions between an engine parameter (x-axis) and a given $CF_n$ (y-axis). There can be more than one relationship per sensor if required, to account for second order effects. For example, there may be different relationships for low power vs high power engine operation, and/or for different altitudes of operation, and/or for different ambient temperatures. Therefore, another way to represent the correction factor ($CF_n$) is as:

$$CF_n = \frac{(Temp_{avg} - Temp_n)}{Temp_n} \cong f(\text{Engine Parameter}) \tag{5A}$$

In some embodiments, the calculated $CF_n$ in accordance with equation (2) may be used to bias the characterized and previously determined $CF_n$ in accordance with equation (5A) by a factor "K", for example to account for engine field deterioration or degradation, and/or engine production scatter, as:

$$CF_{n\_biased} = f(\text{Engine Parameter}) + K \tag{5B}$$

Figure 5:
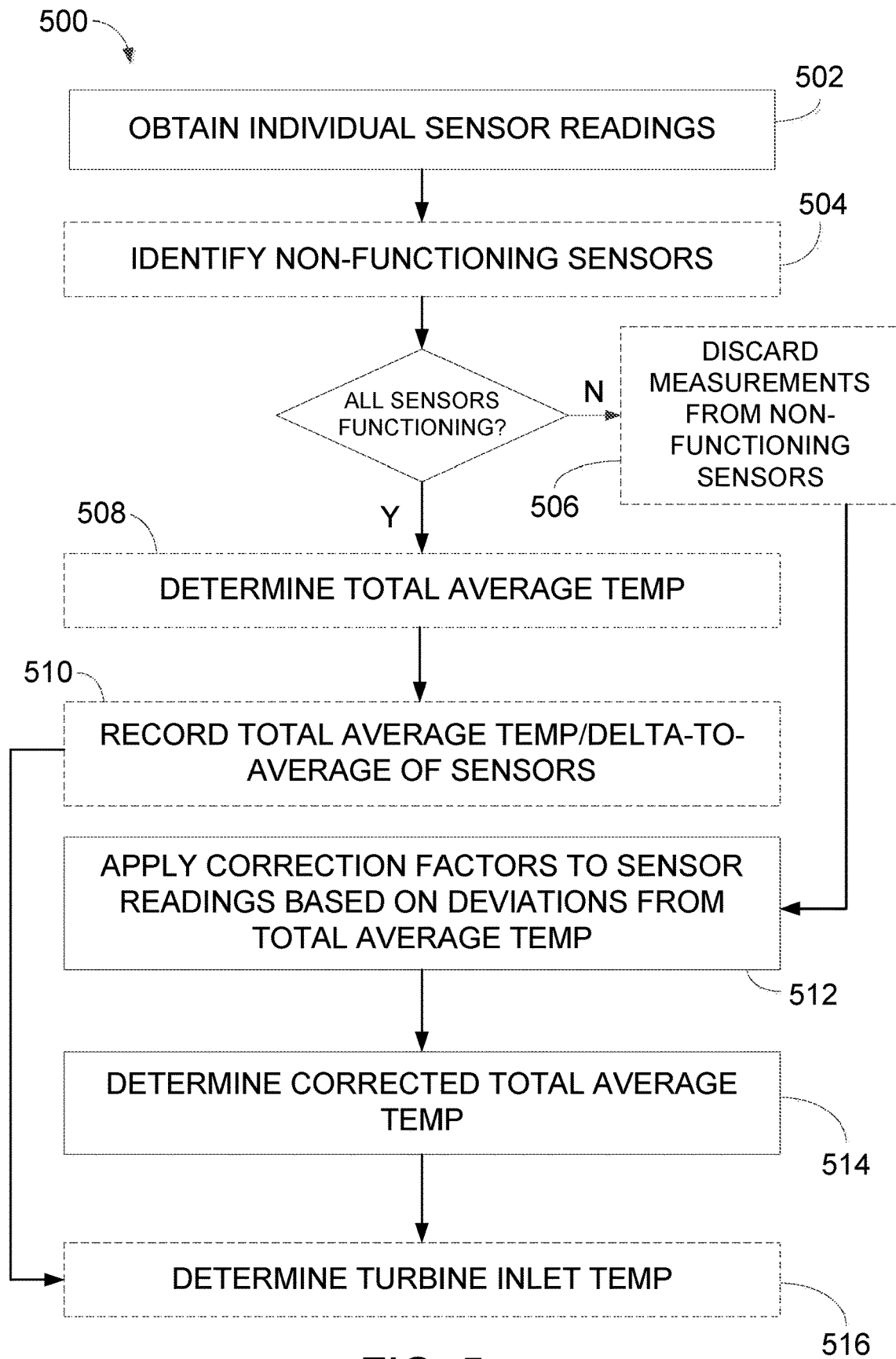
FIG. 5 is a flowchart of an example method for monitoring temperature of a gas turbine engine.

Referring to FIG. 5, there is illustrated an example method 500 for monitoring a temperature of a gas turbine engine. The temperature may be of any location along the gas path of a gas turbine engine. In some embodiments, the location corresponds to a temperature downstream from a turbine inlet temperature (T4.5) and is used to correlate to a temperature for the turbine inlet (T4).

At step 502, individual sensor readings are obtained from N temperature sensors of a sensor array. The individual sensor readings may be obtained periodically or at random times. The sensors may be prompted for a reading or may be configured to automatically send new readings at predetermined time intervals.

At 504, non-functioning sensors may optionally be identified, for example based on the individual sensor readings received at 502. An absence of a sensor reading may be indicative of a non-functioning sensor. A sensor reading that deviates from readings from the other sensors by a significant amount may also be indicative of a non-functioning sensor. In some embodiments, a sensor reading may be compared to historical sensor readings for the same sensor to validate the sensor reading. Alternatively, or in combination therewith, the delta-to-average or correction factor could be compared to historical stored values to identified a non-functioning sensor. Other embodiments for identifying non-functioning sensors may also apply.

When all N temperature sensors of the array are functioning, a total average temperature may be determined at 508. For example, equation (1) may be used by a processing device to determine the total average temperature of the N sensors based on readings obtained from individual sensors in an array. The total average temperature for all N sensors may be recorded at 510. The delta-to-average values for each individual sensor may also be recorded. In some embodiments, steps 508 and 510 are omitted or are previously performed and the method 500 is performed when K<N temperature sensors are functional.

When it is determined at optional step 504 that K<N temperature sensors of the array are functioning, measurements obtained from non-functioning sensors may be discarded at 506. For example, sensor readings are only retained when they deviate from a total average temperature, as previously determined or as determined at step 508, by less than a threshold, or if identified as non-function at step 504. Other embodiments may apply depending on practical implementations.

At 512, correction factors are applied to the individual sensor readings of the K functioning sensors based on deviations of the individual sensor readings from the total average temperature of the N temperature sensors in the array. In some embodiments, the total average temperature and/or delta-to-average values recorded at 510 are used to determine the correction factors. For example, each correction factor may correspond to a difference between the total average temperature previously recorded and a respective one of the individual temperature readings, and the difference is divided by the respective one of the individual temperature readings, as per equation (2). In some embodiments, the correction factors depend on at least one engine parameter of the gas turbine engine and equations (5A) and/or (5B) is used to determine the correction factors. Other embodiments may also apply, such that an arithmetic average of the K functioning probes is equal to (or equal to within a given threshold) the arithmetic average of the N functioning probes:

$$\text{Temp}_{AVG\_K} \cong \text{Temp}_{AVG\_N} \quad (6)$$

At 514, the corrected total average temperature is determined for the K functioning probes, for example using equation (4). In some embodiments, equation (6) may be used to validate the corrected total average temperature.

In some embodiments, the total average temperature, either corrected for K functioning sensors as determined at 514 or un-corrected for N functioning sensors as recorded at 510, may be used to determine the turbine inlet temperature, using a previously determined correlation between the temperature found at the turbine inlet and the temperature found downstream from the turbine inlet. Step 516 may be omitted when the method 500 is used for determining a temperature at a location other than the turbine inlet.

In some embodiments, all sensor readings correspond to potentials (for example in mV) proportional to temperature (for example in ° C.).

Using the method 500, situations normally leading to limited flight dispatchability and/or aircraft-on-ground may be avoided. A temperature array having one or more non-functioning probes may still be used to provide a valid and reliable average temperature measurement as the non-functioning probes are corrected for using the correction factors. There is no need to wait until the non-functioning probes are repaired to dispatch the aircraft, provided the number of remaining functioning probes is sufficient to provide a desired level of precision for an average temperature reading (as corrected). A greater precision requires a greater number of functioning sensors and a lower precision requires a smaller number of functioning sensors. In some embodiments, the method 500 may comprise a step of ensuring that a minimum number of sensors are functional, for example as part of step 504 or 506. When the minimum number of functional sensors is not met, a fault annunciation, for example to the aircraft cockpit, may be issued, resulting in a required maintenance action and/or a grounded aircraft. In some embodiments, a preventive maintenance annunciation is issued, such that the aircraft can still be dispatched but the crew knows that a sensor needs attention.

In some embodiments, correction factors are applied in all circumstances, regardless of whether there are any non-functioning sensors. In this scenario, the correction factors, based on deviations of the individual sensor readings from the total average temperature of the N sensors, are always applied. The additional step performed when all sensors are functioning is the recordal of the total average temperature for N sensors, or updating of a previously recorded total average temperature for N sensors. The total average temperature for N sensors may be updated at a predetermined frequency or time interval.

In some embodiments, the correction factors are applied for N functioning sensors to account for engine degradation and/or deterioration. For example, it may be determined that the accuracy of the total average temperature can be improved using the correction factors to account for a current state of the engine.

In some embodiments, individual sensor readings are obtained from all temperature sensors of a sensor array, non-functioning temperature sensors are identified, correction factors are applied to functioning temperature sensor readings, and a corrected total average temperature is determined as a sum of the corrected individual sensor readings divided by the number of functioning temperature sensors. It will be understood that obtaining individual sensor readings from functioning temperature sensors of a sensor array does not exclude also obtaining sensor readings from non-functioning temperature sensors of the sensor array, which may be discarded.

The method 500 may be used to optimize the configuration of the array of temperature sensors. For example, the geometry of the harness 302 and the number and disposition of the temperature sensors $304_1$-$304_N$ on the harness 302 may be selected to ensure that one, two, three, or any desired number of temperature sensors $304_1$-$304_N$ can become non-functional while still maintaining the integrity of the correct total average temperature.

The method 500 may be used in conjunction with one or more trend-monitoring activity. For example, the detectability of a failure of an individual temperature sensor may be improved based on knowing the status of each individual sensor. Failures can be monitored over time and historical data regarding which sensors fail and after how much time in operation may be obtained. Variations in deltas-to-average may also be monitored over time to provide health status information. The delta-to-average values calculated and stored can be trended to forecast upcoming engine maintenance.

Figure 6:
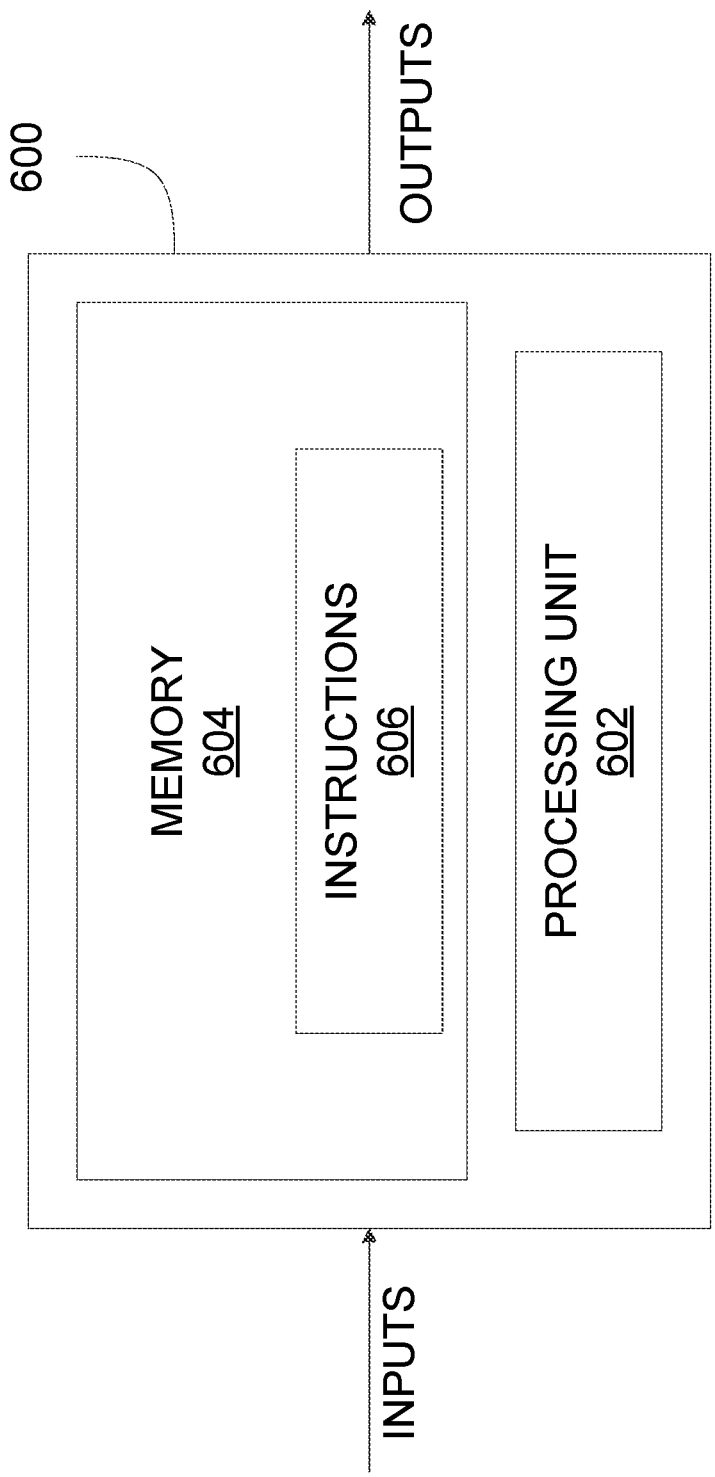
FIG. 6 is a block diagram of an example computing device for implementing the method of FIG. 5.

FIG. 6 is an example embodiment of a computing device 600 for implementing parts or all of the method 500 described above. The computing device 600 comprises a processing unit 602 and a memory 604 which has stored therein computer-executable instructions 606. The processing unit 602 may comprise any suitable devices configured to cause a series of steps to be performed such that instructions 606, when executed by the computing device 600 or other programmable apparatus, may cause the functions/acts/steps specified in the method 500 described herein to be executed. The processing unit 602 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

It should be noted that the computing device 600 may be implemented as part of a FADEC or other similar device, including an electronic engine control (EEC), engine control unit (EUC), engine electronic control system (EECS), an Aircraft Avionics System, and the like. In addition, it should be noted that the techniques described herein can be performed by a computing device 600 substantially in real-time.

The methods and systems for monitoring a temperature of a gas turbine engine as described herein may be implemented in a high level procedural or object oriented programming or scripting language, or a combination thereof, to communicate with or assist in the operation of a computer system, for example the computing device 600. Alternatively, the methods and systems for monitoring a temperature of a gas turbine engine may be implemented in assembly or machine language. The language may be a compiled or interpreted language. Program code for implementing the methods and systems for monitoring a temperature of a gas turbine engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for monitoring a temperature of a gas turbine engine may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for monitoring a temperature of a gas turbine engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for monitoring a temperature of a gas turbine engine, the method comprising:
   obtaining individual sensor readings from functioning temperature sensors of a sensor array, where a number of the functioning temperature sensors is less than a total number of temperature sensors in the sensor array;
   applying correction factors to the individual sensor readings of the functioning temperature sensors based on deviations of the individual sensor readings from a total average temperature of all the temperature sensors in the array to obtain corrected individual sensor readings; and
   determining a corrected total average temperature as a sum of the corrected individual sensor readings divided by the number of functioning temperature sensors.

2. The method of claim 1, further comprising:
   determining the total average temperature when all of the temperature sensors in the array are functioning; and
   recording the difference between each one of the individual sensor readings and the total average temperature for all of the temperature sensors in the array.

3. The method of claim 1, wherein the correction factors correspond to a difference between the total average temperature and a respective one of the individual sensor readings, and the difference is divided by the respective one of the individual sensor readings.

4. The method of claim 1, wherein the correction factors depend on at least one engine parameter of the gas turbine engine.

5. The method of claim 1, further comprising determining that the number of functioning temperature sensors is greater than or equal to a minimum number of temperature sensors.

6. The method of claim 1, wherein the sensor array is disposed to measure temperatures downstream from a turbine inlet of the gas turbine engine.

7. The method of claim 6, further comprising determining a turbine inlet temperature of the gas turbine engine based on the corrected total average temperature.

8. The method of claim 1, further comprising identifying non-functioning temperature sensors in the sensor array.

9. The method of claim 8, further comprising discarding measurements from the non-functioning temperature sensors.

10. The method of claim 8, wherein identifying non-functioning temperature sensors comprises comparing the individual sensor readings to reference individual sensor readings.

11. A system for monitoring a temperature of a gas turbine engine, the system comprising:
- a processing unit; and
- a non-transitory computer-readable medium having stored thereon program instructions executable by the processing unit for:
  - obtaining individual sensor readings from functioning temperature sensors of a sensor array, where a number of the functioning temperature sensors is less than a total number of temperature sensors in the sensor array;
  - applying correction factors to the individual sensor readings based on deviations of the individual sensor readings from a total average temperature of all the temperature sensors in the array to obtain corrected individual sensor readings; and
  - determining a corrected total average temperature as a sum of the corrected individual sensor readings divided by the number of functioning temperature sensors.

12. The system of claim 11, wherein the program instructions are further executable for:
- determining the total average temperature when all of the temperature sensors in the array are functioning; and
- recording the difference between each one of the individual sensor readings and the total average temperature for all of the temperature sensors in the array.

13. The system of claim 11, wherein the correction factors correspond to a difference between the total average temperature and a respective one of the individual sensor readings, and the difference is divided by the respective one of the individual sensor readings.

14. The system of claim 11, wherein the correction factors depend on at least one engine parameter of the gas turbine engine.

15. The system of claim 11, wherein the program instructions are further executable for determining that the number of functioning temperature sensors is greater than or equal to a minimum number of temperature sensors.

16. The system of claim 11, wherein the sensor array is disposed to measure temperatures downstream from a turbine inlet of the gas turbine engine.

17. The system of claim 16, wherein the program instructions are further executable for determining a turbine inlet temperature of the gas turbine engine based on the corrected total average temperature.

18. The system of claim 11, wherein the program instructions are further executable for identifying non-functioning temperature sensors in the sensor array.

19. The system of claim 18, wherein the program instructions are further executable for discarding measurements from the non-functioning temperature sensors.

20. The system of claim 18, wherein identifying non-functioning temperature sensors comprises comparing the individual sensor readings to reference individual sensor readings.

* * * * *